United States Patent
Abánades Velasco et al.

(10) Patent No.: US 11,746,010 B2
(45) Date of Patent: Sep. 5, 2023

(54) PROCESS AND DEVICE FOR DIRECT THERMAL DECOMPOSITION OF HYDROCARBONS WITH LIQUID METAL IN THE ABSENCE OF OXYGEN FOR THE PRODUCTION OF HYDROGEN AND CARBON

(71) Applicants: UNIVERSIDAD POLITECNICA DE MADRID, Madrid (ES); KARLSRUHER INSTITUT FÜR TECHNOLOGIE, Karlsruhe (DE)

(72) Inventors: Alberto Abánades Velasco, Madrid (ES); Javier Muñoz Antón, Madrid (ES); José María Martínez-Val Peñalosa, Madrid (ES); Tobias Geissler, Steinheim an der Murr (DE); Leonid Stoppel, Eggenstein-Leopoldshafen (DE); Benjamin Dietrich, Stutensee (DE); Michael Plevan, Munich (DE); Thomas Wetzel, Walzbachtal (DE)

(73) Assignees: UNIVERSIDAD POLITECNICA DE MADRID, Madrid (ES); KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 595 days.

(21) Appl. No.: 16/967,694

(22) PCT Filed: Feb. 1, 2019

(86) PCT No.: PCT/EP2019/052509
§ 371 (c)(1),
(2) Date: Aug. 5, 2020

(87) PCT Pub. No.: WO2019/154732
PCT Pub. Date: Aug. 15, 2019

(65) Prior Publication Data
US 2021/0032102 A1     Feb. 4, 2021

(30) Foreign Application Priority Data
Feb. 6, 2018  (EP) ................................. 18382064

(51) Int. Cl.
*C01B 32/05*     (2017.01)
*C01B 3/34*      (2006.01)
*B01J 6/00*      (2006.01)

(52) U.S. Cl.
CPC ............ *C01B 3/348* (2013.01); *B01J 6/00* (2013.01); *C01B 32/05* (2017.08); *C01B 2203/0272* (2013.01); *C01B 2203/049* (2013.01)

(58) Field of Classification Search
CPC ...................................................... C01B 32/05
See application file for complete search history.

(56) References Cited

U.S. PATENT DOCUMENTS 2,794,709 A * 6/1957 Kirkbride ............... C09C 1/54
                                                      422/150
5,015,288 A * 5/1991 Kusik .................... C22B 9/006
                                                      266/159

(Continued)

FOREIGN PATENT DOCUMENTS

WO     2009145936 A1     3/2009

OTHER PUBLICATIONS

M. Plevan, T. Geiβler, A. Abanades, K. Mehravaran, R.K. Rathnam, C. Rubbia, D. Salmieri, L. Stoppel, S. Stückrad, TH. Wetzel, Thermal cracking of methane in a liquid metal bubble column reactor: Experiments and kinetic analysis. International Journal of hydrogen energy vol. 40 (2015), pp. 8020-8033, Elsevier (Publisher), Germany.

(Continued)

*Primary Examiner* — Stuart L Hendrickson
(74) *Attorney, Agent, or Firm* — Jayne Saydah, Esq., LLC

(57) ABSTRACT

Direct thermal decomposition of hydrocarbons into solid carbon and hydrogen is performed by a process and a device.

(Continued)

The process comprises preheating a hydrocarbon gas stream to a temperature between 500° C. and 700° C. and injecting the pre-heated hydrocarbon gas stream into the reactor pool of a liquid metal reactor containing a liquid media; forming a multi-phase flow with a hydrocarbon gas comprising hydrogen and solid carbon at a temperature between 900° C. and 1200° C.; forming a carbon layer on the free surface of the liquid media made up of solid carbon particles which are then displaced into at least one carbon extraction system and at least one recipient for collecting them; and, at the same time, the gas comprising hydrogen leaves the reactor pool through a porous rigid section, being collected at a gas outlet collector from where the gas comprising hydrogen finally leaves the liquid metal reactor.

6 Claims, 2 Drawing Sheets

(56) References Cited

U.S. PATENT DOCUMENTS

| | | | |
|---|---|---|---|
| 5,577,346 A * | 11/1996 | Malone | C10J 3/57 92/92 |
| 5,767,165 A | 6/1998 | Steinberg et al. | |
| 6,395,197 B1 | 5/2002 | Detering et al. | |
| 6,872,378 B2 | 3/2005 | Weimer et al. | |
| 8,002,854 B2 | 8/2011 | Muradov | |
| 9,156,017 B2 | 10/2015 | Lee et al. | |
| 2006/0130400 A1 | 6/2006 | Bockris | |
| 2007/0256361 A1 | 11/2007 | Kindig | |
| 2008/0210908 A1 | 9/2008 | Zhu et al. | |
| 2011/0289845 A1 | 12/2011 | Davis et al. | |

OTHER PUBLICATIONS

T. Geißler, M. Plevan, A. Abánades, A. Heinzel, K. Mehravaran, R. Rathnam, C. Rubbia, D. Salmieri, L. Stoppel, S. Stückrad, A. Weisenburger, H. Wenninger, TH. Wetzel, Experimental investigation and thermo-chemical modelling of methane pyrolysis in a liquid metal bubble column reactor with a packed bed. International Journal of hydrogen energy vol. 40 (2015), pp. 14134-14146, Elsevier (Publisher), Germany.

A. Abánades, R. Rathnam, T. Geißler, A. Heinzel, K. Mehravaran, G. Müller, M. Plevan, C. Rubbia, 3. Salmieri, L. Stoppfi , S. Stückrad, A. Weisenburger, H. Wenninger, TH. Wetzel, Development of methane decarbonisation based on liquid metal technology for CO2-free production of hydrogen. International Journal of hydrogen energy, vol. 41 (2016), pp. 8159-8167, Elsevier (Publisher), Germany.

T. Geißler, A. Abánades, A. Heinzel, K. Mehravaran, G. Müller, R.K. Rathnam, C. Rubbia, D. Salmieri, L. Stoppel, S. Stückrad, A. Weisenburger, H. Wenninger, TH. Wetzel, Hydrogen production via methane pyrolysis in a liquid metal bubble column reactor with a packed bed. Chemical Engineering Journal vol. 299 (2016), pp. 192-200, Elsevier (Publisher), Germany.

L. Stoppel, T. Fehling, T. Geißler, E. Baake and T. Wetzel, Carbon dioxide free production of hydrogen. IOP Conf. Ser.: Mater. Sci. Eng. vol. 228 (2017), pp. 1-8, IOP Publishing, United Kingdom.

Thomas Emmerich, Carsten Schroer, Corrosion in austenitic steels and nickel-based alloys caused by liquid tin at high temperature, Corrosion Science, vol. 120 (2017) pp. 171-183, Elsevier (Publisher), Germany; ISSN 0010-938X, https://doi.org/10.1016/j.corsci.2017.02.025.

Karlsruhe Institute of Technology, M. Plevan, Development of a process for the thermal decomposition of methane into hydrogen and carbon using liquid metals as a heat transfer medium, (2017), pp. 1-186, Germany.

Karlsruhe Institute of Technology, T. Emmerich, Material related aspects of the thermal decomposition of methane in liquid tin, (2018), pp. 1-160, Germany.

Karlsruhe Institute of Technology, T. Geissler, Methane pyrolysis in a liquid metal bubble column reactor, (2017), pp. 1-230, Germany.

English-language machine translation of: Karlsruhe Institute of Technology, T. Emmerich, Material related aspects of the thermal decomposition of methane in liquid tin, 2 pages (2018).

English-language machine translation of: Karlsruhe Institute of Technology, T. Geissler, Methane pyrolysis in a liquid metal bubble column reactor, 2 pages (2017).

Palmer H.B, Hirt T.J. "The Activation Energy for the Pyrolisis of Methane", The Journal of Physical Chemistry, vol. 67, Issue 3, pp. 709-711, (1963) USA, Publisher: ACS Publications.

A. M. Amin, et al., "Review of methane catalytic cracking for hydrogen production", International Journal of Hydrogen Energy, vol. 36, Issue 4, pp. 2904-2935 (2011) Netherlands, Publisher: Elsevier.

H.F. Abbas and W.M.A. Wan Daud, "Hydrogen production by methane decomposition: A Review", International Journal of Hydrogen Energy, vol. 35, Issue 3, pp. 1160-1190 (2010) Netherlands, Publisher: Elsevier.

S. Rodat, S. Abanades, G. Flamant, "Co-production of Hydrogen and Carbon Black from Solar Thermal Methane Splitting in a Tubular Reactor Prototype", Solar Energy, vol. 85, pp. 645-652 (Apr. 2011) Netherlands, Publisher: Elsevier.

N. Muradov et al., "Thermocatalytic Decomposition of Natural Gas Over Plasma-generated Carbon Aerosols for Sustainable Production of Hydrogen and Carbon", Applied Catalysis A: General, vol. 365, Issue 2, pp. 292-300 Aug. 31, 2009 Netherlands, Publisher: Elsevier.

B. Gaudernack and S. Lynum, "Hydrogen from Natural Gas Without Release of CO2 to the Atmosphere", International Journal of Hydrogen Energy, vol. 23, Issue 12, pp. 1087-1093 (1998) Great Britain, Publisher: Elsevier.

M. Plevan et al., "Thermal Cracking of Methane in a Liquid Metal Bubble Column Reactor: Experiments and Kinetic Analysis", International Journal of Hydrogen Energy vol. 40, Issue 25, pp. 8020-8033 (Jul. 6, 2015) Netherlands, Publisher: Elsevier.

PCT International Search Report and Written Opinion and Written Opinion of the International Searching Authority, dated Sep. 4, 2019.

Manuela Serban et al: "Hydrogen Production by Direct Contact Pyrolysis of Natural Gas", Energy & Fuels., vol. 17, No. 3, May 1, 2003 (May 1, 2003), pp. 705-713, Washington, DC, USA, Publisher: American Chemical Society paragraph [0705]—paragraph [0706], and paragraph [0711]; figures 1 and 11.

* cited by examiner

PROCESS AND DEVICE FOR DIRECT THERMAL DECOMPOSITION OF HYDROCARBONS WITH LIQUID METAL IN THE ABSENCE OF OXYGEN FOR THE PRODUCTION OF HYDROGEN AND CARBON

CROSS-REFERENCES TO RELATED APPLICATIONS

This application is the U.S. National Stage of International Application No. PCT/EP2019/052509 filed on Feb. 1, 2019, which claims the benefit of priority from European Patent Application No. 18382064.6 filed on Feb. 6, 2018, the contents of which are both herein incorporated by reference in their entirety.

BACKGROUND OF THE INVENTION

Field of the Invention

The present invention relates to the field of production of hydrogen and carbon by direct thermal decomposition of hydrocarbons. The chemical reaction is produced in a liquid metal reactor in which gas hydrocarbon is injected. The reactor and its integrated process constitute a carbon capture system with the aim of achieving a $CO_2$-free utilization of gaseous hydrocarbons by their conversion into hydrogen.

Description of the Related Art

Climate change is one of the pressing challenges facing our society. New technological developments should be put into practice to limit climate change. Fossil fuels such as oil, coal and natural gas will continue to play a very important role throughout this century. In particular, the consumption of natural gas is likely to increase due to consistently low prices resulting from the exploitation of unconventional reserves. Natural gas may also substitute oil in some industrial chemical processes. Finding a technological solution for continuing the utilization of fossil-fuel resources while avoiding $CO_2$ emissions is key to achieving the climate protection targets. Such a technology could serve as a bridging solution during the transition from a fossil-fuel based economy to a more sustainable one, making it possible to exploit available resources until a new system is completely implemented. Two major pathways in this direction are capturing the carbon content of fossil-fuels before or after their utilization. The former process is known as fossil-fuel decarbonization and the latter carbon (dioxide) capture and sequestration (CCS) and utilization (CCU).

The decarbonization of natural gas consists of the transformation of its components into pure solid carbon and hydrogen trough a cracking/pyrolysis reaction. For the case of methane the basic formulation is:

$$CH_4 \rightarrow C + 2H_2 \Delta H = 74.5 \text{kJ/mol-}H_2$$

To develop this reaction, temperatures above 500° C. are required, with energy inputs able to break the strong molecular C—H bonds (437 kJ/mol). Experimental analysis has reported that temperatures up to 1100° C. reach reaction rates above 95% in thermodynamic equilibrium conditions.

The need of low-carbon processes is a must for the development of our society, either for the energy sector as for many industrial processes. Hydrogen is one of the vectors that should be metabolized to keep our system running. For instance, hydrogen is a critical feedstock for ammonia production or refineries that will need the availability of a hydrogen production system free of $CO_2$ or for the implementation of Power-to-Gas systems. Most of the hydrogen of the world is currently produced by methane steam reforming and coal gasification, generating $CO_2$.

Methane decomposition into carbon and hydrogen has been studied since decades (Palmer H B, Hirt T J. The Journal of Physical Chemistry, 67(3):709-711 (1963)). A number of researchers have conducted experimental and theoretical work to understand the reaction through several methods: catalytic methane cracking (A. M. Amin, et al., International Journal of Hydrogen Energy, 36, 2904 (2011); H. F. Abbas and W. M. A. Wan Daud, International Journal of Hydrogen Energy, 35, 1160 (2010)), thermal pyrolysis (S. Rodat, S. Abanades, G. Flamant, Solar Energy, 85, 645 (2011)), or plasma-arch decomposition (N. Muradov, et al., Applied Catalysis A: General, 365, 292 (2009); B. Gaudernack and S. Lynum, International Journal of Hydrogen Energy, 23, 12, 1087-1093 (1998)). Results obtained from the laboratory-scale studies of methane decomposition show that high conversion rates of methane into hydrogen (with almost complete conversion of methane) are feasible at very high temperatures (>1300° C.) or at comparatively lower temperatures (>500° C.) using a suitable catalyst.

Some previous patents have been also addressed to the development of hydrocarbon decomposition reactors and processes, such as U.S. Pat. Nos. 6,395,197, 6,872,378, US 20060130400, WO 2009145936 or U.S. Pat. No. 8,002,854. All these previous inventions are related to catalytic, direct thermal or plasma/microwaves induced methane decomposition.

The most relevant patent for methane decarburization using a molten media is U.S. Pat. No. 5,767,165 referred to a process for the production of methanol comprising thermally decomposing methane to produce hydrogen. In particular, claim 1 of U.S. Pat. No. 5,767,165 describes that the methane thermal decomposition comprises: "( . . . ) bubbling the methane through a bath comprised of a molten material operating at a temperature of at least 800° C. and a pressure of 1 atm to 10 atm; cracking said methane through the use of said molten material such that elemental carbon and hydrogen gas are formed; removing the hydrogen gas from the top of the bath; and collecting the elemental carbon off the top of the liquid surface of the bath". In said patent, methane decomposition reactor, named as MDR, is only described as the device to carry out the process. However, there is no disclosure of the physical implementation and details of the technology. In particular, the simulation process described in said US patent shows data obtained at 800° C. and 1 atm, resulting in a conversion rate corresponding to the theoretical limit of 91.9%. It has been demonstrated and published in peer-reviewed journals that this practical configuration is not realistic at a reasonable scale and that it is only achievable theoretically (M. Plevan et al., International Journal of Hydrogen Energy 40, No. 25 (2015) 8020-8033). It is likely that, at the conditions described in the claims, a very large (practically infinite) methane residence time would be required. The present invention, on the contrary, refers to a practical physical configuration that will be able to be implanted at industrial scale based on the utilization of liquid metal technology.

Other patents related to liquid metal technology applied to methane or hydrocarbon describe very different approaches from the process object of the present invention. This is the case, for example, of U.S. Pat. No. 9,156,017.

The present invention addresses all the technical difficulties and disadvantages of the processes described in the state of the art. In particular, it describes a new process for the production of high purity hydrogen and pure graphitic carbon, avoiding $CO_2$ emissions, and the reactor for carrying out said process. One of its advantages is that it will be suitable for working at an industrial scale (ton/h). Also, it allows to dramatically reduce the costs and environmental impact as compared with the processes available at the state of the art.

This is a revolutionary invention since there is no disclosure in the state of the art describing a reactor suitable for working at industrial scale transforming a hydrocarbon gas (preferably methane) into hydrogen and carbon with almost no production of $CO_2$.

BRIEF SUMMARY OF THE INVENTION

It is a first object of the invention a process for the direct thermal decomposition of hydrocarbons into solid carbon and hydrogen comprising:

preheating a hydrocarbon gas stream conducting the hydrocarbon gas stream through a conduit located surrounding the external perimeter of at least one liquid metal reactor, said conduit being located inside a thermal insulation means, from at least one hydrocarbon gas stream inlet, located at the top part of the liquid metal reactor, to the bottom part of the liquid metal reactor, obtaining a pre-heated hydrocarbon gas stream at a temperature between 500 and 700° C., and more preferably between 650 and 700° C.;

injecting the pre-heated hydrocarbon gas stream obtained in step (a) into the liquid metal reactor, in particular, into a reactor pool containing a liquid media. This injection takes places at the bottom part of the liquid metal reactor, preferably through a porous section or a set of orifices distributed along the bottom part of the liquid metal reactor, injecting the hydrocarbon gas through a gas distributor into the liquid media;

once inside the reactor pool, the hydrocarbon gas moves upwards by buoyancy forming a multi-phase flow, the hydrocarbon gas being decomposed into a gas comprising hydrogen and solid carbon, at the same time that the temperature inside the reactor pool is controlled and maintained at a temperature preferably comprised between 900 and 1200° C. and more preferably between 1050 and 1100° C. Preferably, this temperature will be reached by means of at least one thermal heater located inside the reactor pool or any other method suitable for inducing an homogeneous temperature in the liquid media contained inside the liquid metal reactor;

the solid carbon obtained in step (c) is accumulated at the top of the reactor pool, on the free surface of the liquid media located inside the liquid metal reactor, forming a carbon layer made up of solid carbon particles;

once the carbon layer reaches a determined thickness (preferably between 1 and 15 cm) over the free surface of the liquid metal, determined by the gas hold-up in the nominal conditions of the design, the carbon particles constituting said layer are displaced into at least one carbon extraction system consisting of a porous rigid section located at the top of the liquid metal reactor, above the free surface of the liquid media, from which they are conducted into at least one recipient for collecting the carbon particles, and preferably two recipients located at opposite sides of the liquid metal reactor. Preferably, the movement of the carbon particles towards the recipient for collecting them will be facilitated by a vibrational movement generated by a mechanical means such as a mechanical shaft. When reaching said recipient the solid carbon particles will preferably fall therein by gravity;

at the same time, the gas comprising hydrogen obtained in step (c) leaves the reactor pool through the porous rigid section, being collected at a gas outlet collector from where the gas comprising hydrogen finally leaves the liquid metal reactor.

It is a further object of the invention the device for carrying out said process. In particular, this device will be suitable for carrying out the direct thermal decomposition of hydrocarbons into solid carbon and hydrogen and will comprise:

a conduit comprising at least one hydrocarbon gas inlet located at the top of a liquid metal reactor and at least one hydrocarbon gas outlet located at the bottom of the liquid metal reactor corresponding to the hydrocarbon gas inlet into the liquid metal reactor, and in particular into a reactor pool designed for containing a liquid media, preferably through a porous section or a set of orifices distributed along the bottom part of the liquid metal reactor and wherein said conduit is located inside a thermal insulation means;

the liquid metal reactor further comprises at least one thermal heater located inside the reactor pool or any other media suitable for inducing an homogeneous temperature inside the liquid metal reactor;

in addition, at the top of the liquid metal reactor, at least one carbon extraction system consisting of a porous rigid section is located, said porous rigid section being connected to at least one recipient suitable for collecting carbon particles, and preferably two recipients located at opposite sides of the liquid metal reactor. The connection between the porous rigid section and the recipient for collecting carbon particles will preferably incorporate mechanical means (such as a mechanical shaft) for facilitating the movement of the solid carbon particles;

the porous rigid section also incorporates, at the top of it, a barrier designed for the carbon particle retention, wherein said barrier separates the porous rigid section from a gas outlet collector comprising at least one gas outlet.

BRIEF DESCRIPTION OF THE SEVERAL VIEWS OF THE DRAWINGS

For a better understanding of the invention, the following figures are included.

DETAILED DESCRIPTION OF THE INVENTION

Figure 1:
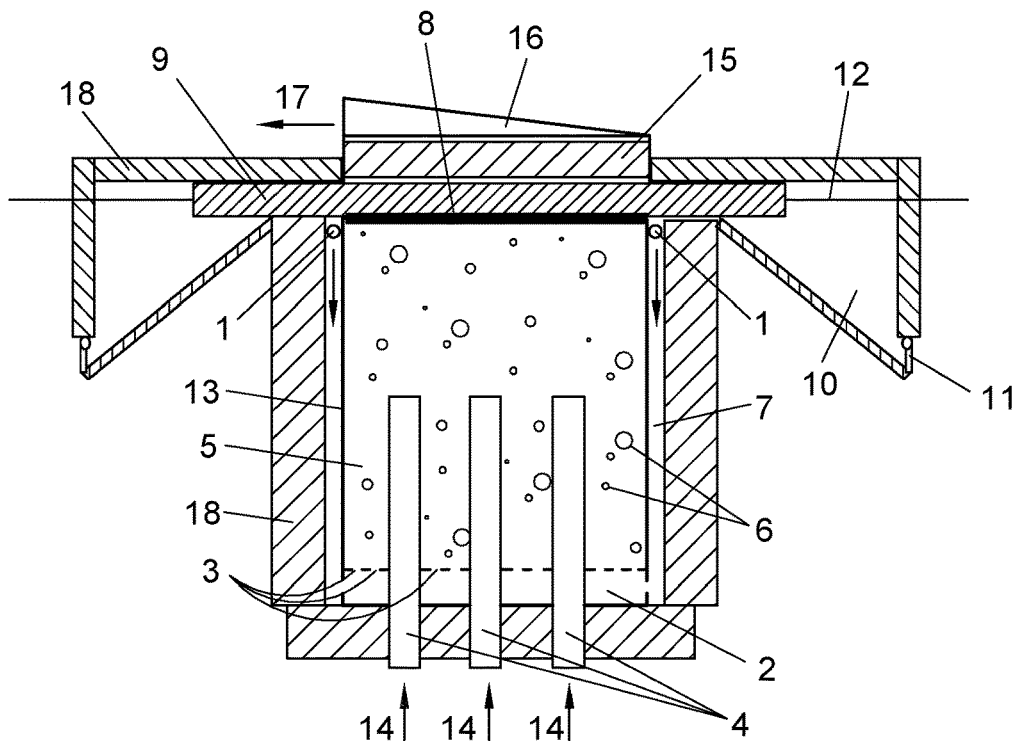
FIG. 1 provides a section view of the equipment for carrying out the direct thermal decomposition of hydrocarbons into solid carbon and hydrogen.
Figure 2:
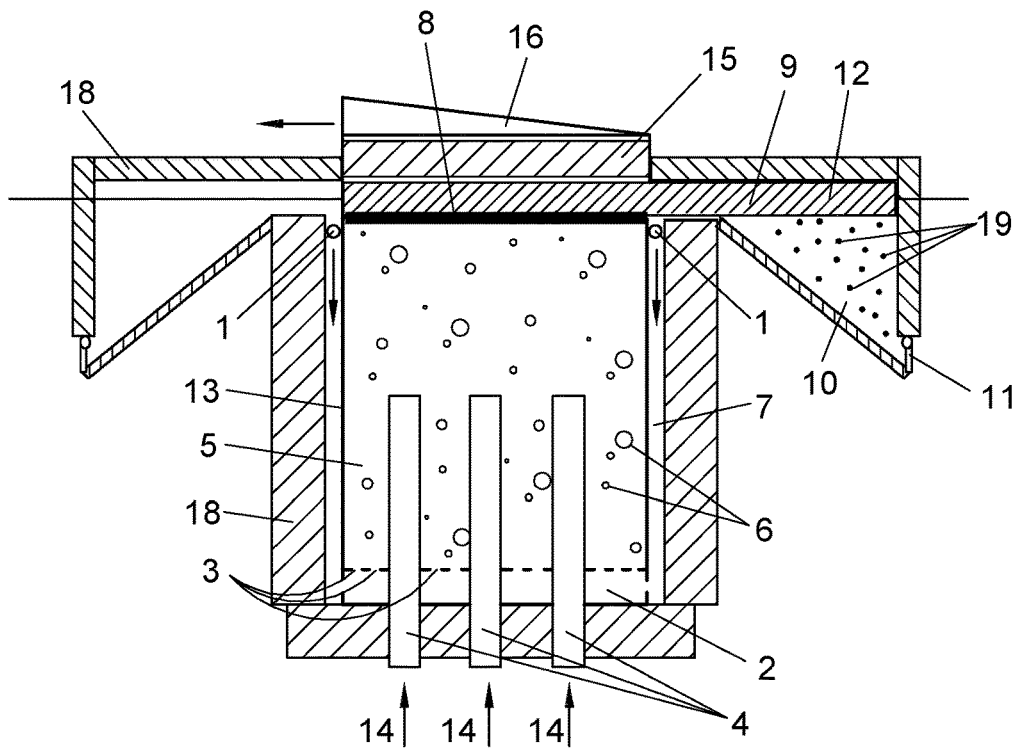
FIG. 2 corresponds to the equipment as shown in FIG. 1, wherein the carbon solid particles generated during the process are also shown.

FIGS. 1 and 2 show a particular embodiment of the device designed to carry out the process as claimed.

In the context of this document, a liquid metal reactor can be interpreted as a reactor wherein a gas-liquid chemical reaction takes place. Although in the figures it has a rectangular shape, other shapes are also possible. In addition, the cross section of the reactor can be varied in order to achieve a given nominal hydrogen flow rate production, as the hydrogen flow rate production will directly depend on the hydrocarbon injection rate at the bottom (kg HC/m$^2$) and the conversion rate (depending on the operation temperature, generally around 0.8).

This process is particularly suitable for treating a C1-C5 hydrocarbon gas. In a preferred embodiment of the process as claimed the hydrocarbon gas will consist of natural gas alone. In another embodiment, the hydrocarbon gas will be a mixture preferably comprising a hydrocarbon gas and nitrogen or any other inert gas suitable for keeping stable the gas hold-up close to its nominal conditions. The relation inert gas/hydrocarbon in the gas mixture will preferably be, in volume, 0/100 in nominal conditions, 50/50 during the operation of the reactor at 50% of its full capacity, and 100/0 at warm stand-by conditions (at any temperature between 500 and 1100° C.) with no $H_2$/C production. In this way, a stable operation will be achieved, working at a controlled flow rate.

The hydrocarbon gas stream will be fed to the equipment at a pressure and mass flow determined by the intended hydrogen and carbon production rate. In particular, the hydrocarbon gas stream will enter the equipment through at least one hydrocarbon gas inlet (1) and will be conducted through a pre-heating conduit (7) located surrounding the external perimeter of the liquid metal reactor, inside thermal insulation means (18). Said thermal insulation means (18) will be preferably made up of a material suitable for complying with a reasonable temperature (preferably equal to or below 70° C.) at the outer surface in contact with the atmosphere surrounding the liquid media reactor, i.e., at a temperature required to comply with the safety regulation conditions in the site of the reactor.

Preferably, the hydrocarbon gas will be pre-heated until reaching a temperature between 500 and 700° C. and more preferably between 650 and 700° C. Next, the pre-heated hydrocarbon gas stream enters the liquid metal reactor at the bottom part thereof. In particular, it is injected from a gas distributor (2) into the reactor pool (13) that contains a liquid metal media (5) through a porous section or a set of gas injection orifices (3) distributed along the bottom of the liquid metal reactor.

In a preferred embodiment of the invention, the reactor pool (13) will be built with a material compatible with the liquid metal in the presence of hydrogen and at temperatures generally equal to or bellow 1200° C. Preferably, this material can be quartz, since it has almost null corrosion rates in contact with the liquid metal used in the process, even at high temperatures. Other materials such as SiC, $Al_2O_3$, molybdenum, surface-coated steels or graphite can also be used.

In addition, the liquid metal media (5) can comprise, preferably, molten tin. However, other metal materials such as lead, a eutectic alloy (45/55) of lead and bismuth or a carbonate molten salt could also be used, such as $NaCO_3$.

Preferably, the liquid metal media (5) contained in the reactor pool (13) should exceed a level of 0.75 m to achieve a reasonable residence time of the hydrocarbon inside the reactor. The height of reactor pool (13) should be designed accounting for the choice of the liquid metal media (5) level, its hold-up due to the gas injection in nominal conditions, as well as the carbon accumulation layer (8), the porous rigid section (9) and the carbon barrier (15) plus a reasonable safety margin between 5 and 15% in height.

The liquid metal media (5) contained in the reactor pool (13) is heated until a given operating temperature, preferably from 900 to 1200° C. by at least one thermal heater (4) located inside the reactor pool (13). Preferably, the number of thermal heaters (4) inside the reactor pool (13) will vary from 1 (corresponding to approximately 1 kW) to at least 20 (corresponding to approximately 1 MW) and they will be physically separated from the reactor pool (13) by a few centimeters gap (preferably between 0.5 and 5 cm), permitting the evacuation of flue gases. Such distribution of thermal heaters (4) is designed in number and position to obtain a homogeneous temperature in the liquid metal media (5).

The thermal heaters (4) may comprise gas burners of a fuel that may consist of a mixture of natural gas and hydrogen at any range (including the possibility of being only natural gas or only hydrogen). In other embodiments, the thermal heaters (4) may comprise at least one carbon electrode heater. The required energy input (14) for the thermal heaters (4), in the form of fuel or electricity, will be provided at the bottom of said thermal heaters (4), by a convenient perforation in the thermal insulation means (18) of the liquid metal reactor. Preferably, the thermal heater (4) will be controlled to provide both the energy required to compensate the thermal losses of the equipment to the ambient and the input required for the endothermic decomposition reaction.

The hydrocarbon gas injected into the liquid metal media (5) moves upwards by buoyancy forming bubbles (6) or another similar two-phase flow. At the same time, the hydrocarbon gas is decomposed into hydrogen and solid carbon. The conversion to hydrogen will depend on the temperature of liquid metal media (5) and the residence time of the gas inside the liquid metal reactor. Such residence time, for example, depends on the vertical height of the liquid media reactor, as well as on the characteristics of the liquid metal media (5). A higher height implies a higher residence time and a higher conversion. For example, at around 1200° C. and 1 m height, the conversion rate will be of the order of 75%.

As a result of the decomposition reaction, the carbon produced will be accumulated at the top of the liquid metal media (5), forming a carbon accumulation layer (8) on its free surface, which will grow due to the accumulation of carbon particles (19) produced during the continuous operation of the liquid metal reactor. Above the free surface of the liquid metal media (5), a porous rigid section (9) is located. After a certain operation time, this porous rigid section (9) is filled with carbon particles (19), once the carbon layer (8) has reached a determined thickness. The porosity of this porous rigid section (9) may vary from 0.2 to 0.8 (measured by standard methods, such as differential volume estimation). Preferably, this porosity value will be determined as a compromise between the expected carbon production rate and the elapsed time between carbon removal cycles. The height of the porous rigid section (9) will depend on the carbon production capacity of the system, generally ranging from 1 to 50 centimeters, approximately. Preferably, the porous rigid section (9) will be made from a ceramic, a metallic material, quartz or any other material compatible with a hydrogen rich atmosphere at the temperatures equal to or below 1200° C.

Figure 3:
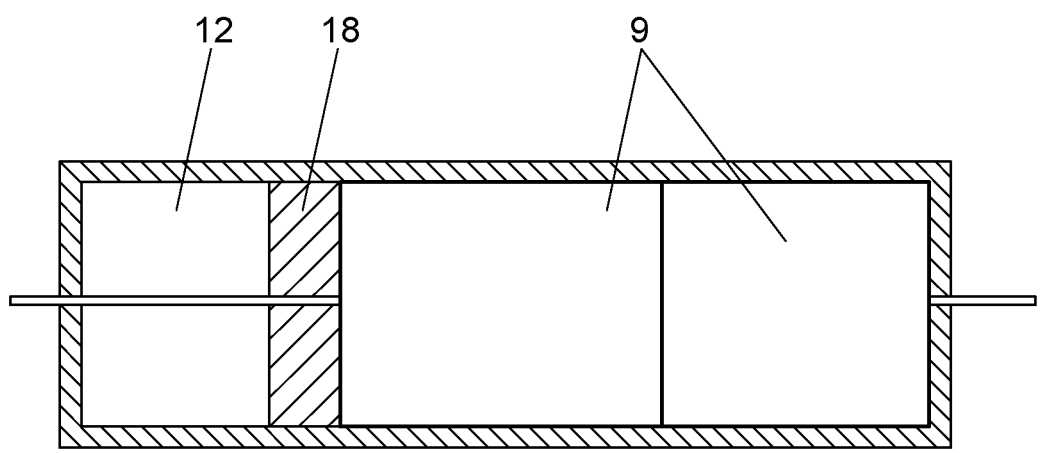
FIG. 3 provides a top view of the equipment as shown in FIG. 1.

The carbon particles (19) will then be conducted from the porous rigid section (9) to at least one recipient suitable for collecting them. Preferably, the equipment will comprise at least two recipients or tanks (10) located at the top of the liquid metal reactor, one opposite the other, spreading outwards from the reactor. These recipients (10) will have enough size to allow collecting all the carbon particles (19) coming from the porous rigid section (9). Preferably, the carbon particles (19) will be driven by a mechanic shaft (12), which will alternatively displace the porous rigid section (9)

from one recipient (10) to the other, as shown in FIGS. 2 and 3. The carbon particles (19) constituting the porous rigid section (9) will then fall (generally by gravity) into the recipients (10), helped if needed by the vibration of the mechanic shaft (12) or any other dynamic means such as the circulation of an inert gas. The carbon particles (19) collected at the recipients (10) will then be removed from the liquid metal reactor, for example, by means of at least one carbon extraction outlet (11) located in each of the recipients (10).

Preferably, the porous rigid section (9) will have at least double the size of the reactor cross section in order to allow collecting the carbon particles (19) at the rigid porous section (9), at the same time that the carbon particles (19) are removed by gravity, enhanced with mechanical vibrations. This is shown in FIGS. 2 and 3.

The gas phase resulting from the reaction crosses the porous rigid section (9) and leaves the reactor at the top, through a gas outlet collector (16). This gas outlet collector (16) concentrates the gas comprising hydrogen and other hydrocarbons before leaving the equipment through at least one gas mixture outlet (17).

Preferably, between the porous rigid section (9) and the gas outlet collector (16) a gas departiculation section comprising a carbon barrier (15) is also located. Said carbon barrier (15) may comprise cross laminates, which will be preferably made of a ceramic or a metallic material compatible with a hydrogen-rich atmosphere and the structural material of the reactor pool (13). This gas departiculation section will avoid the flow of carbon particles (19) in the gas outlet (17) of the equipment. In this way, the gas stream leaving the reactor will be a hydrogen-rich gas mixture that will be able to be conducted to its direct application or to a conditioning process to purify the hydrogen stream and/or adapt its temperature and pressure.

The equipment may be designed as to obtain hydrogen flow rates (in terms of energy) from 100 W to 250 MW, approximately. Also, it will be possible to operate one single reactor or multiple reactors, depending on the results to be achieved.

In addition, conversion rates from the hydrocarbon gas (preferably methane) to hydrogen in the equipment as claimed will depend on the temperature and height of the liquid metal media (5), being able to achieve transformation rates from 20 to 80%.

Example of One Particular Embodiment of the Invention

In the following table, a preferred configuration of the reactor object of the present invention is described for an industrial scale application producing 6 tons per hour of hydrogen, what corresponds to approximately 73000 m³N/h of hydrogen and 23.6 t/g of carbon, with tin as liquid metal.

|  |  | Unit |
| --- | --- | --- |
| Tin filing height | 1 | m |
| Tin volume | 213.2 | m³ |
| Gas pressure at inlet | 15 | bar |
| Gas hold-up | 0.153 | m |
| Porous section thickness | 0.07 | m |
| Porous section position from methane injection | 1.16 | m |
| Hydrogen production | 2.15 | kg/s |
| Carbon production | 6.46 | kg/s |
| Inlet methane flow rate | 14.7 | kg/s |

-continued

|  |  | Unit |
| --- | --- | --- |
| Heating power of thermal heaters | 58 | MW |
| Reactor temperature | 1100 | ° C. |
| Cross section reactor | 213.2 | m² |
| Conversion gas-H₂ | 58.6 | % |
| Carbon extraction cycling | 500 | S |

In this example, a nominal methane flow rate of 14.7 kg/s was fed into the liquid metal reactor at a pressure of 15 bar. Preferably, the hydrocarbon gas is pre-heated until reaching a temperature between 500 and 700° C. Next, the pre-heated hydrocarbon gas stream enters the liquid metal reactor at the bottom part thereof, said reactor having a cross section of 213.2 m². In particular, it is injected into a reactor pool that contains a liquid metal media of 1 m height. In this particular embodiment, the liquid media consists of molten tin and it is at a temperature of 1100° C.

The hydrocarbon gas injected into the liquid metal media moves upwards by buoyancy forming bubbles. At the same time, the hydrocarbon gas is decomposed into hydrogen (at a rate of 2.15 kg/s) and solid carbon (at a rate of 6.46 kg/s). The conversion to hydrogen in this case is of 58.6%, as it is operating at 1100° C.

As a result of the decomposition reaction, the carbon produced is accumulated at the top of the liquid metal media forming a carbon layer on its free surface, which will grow due to the accumulation of carbon particles produced during the continuous operation of the liquid metal reactor. Above the free surface of the liquid metal media a porous rigid section is located, in particular, at a height of 1.16 m from the methane injection. This porous rigid section is filled with carbon particles, once the carbon layer has reached a thickness of 0.07 m. The carbon particles are then driven by a mechanic shaft from the porous rigid section to two recipients suitable for collecting them, one opposite the other. The carbon particles collected at the recipients are then removed from the liquid metal reactor, for example, by means of at least one carbon extraction outlet located in each of the recipients.

The gas phase resulting from the reaction crosses the porous rigid section and leaves the reactor at the top, through a gas outlet collector. This gas outlet collector concentrates the gas comprising hydrogen and other hydrocarbons before leaving the device through at least one gas mixture outlet. In this particular embodiment, the height of the gas hold-up is of 0.153 m. The gas stream leaving the reactor is a hydrogen-rich gas mixture containing 6.08 kg/s of methane and 2.15 kg/s of hydrogen (73.8/26.2% weight; 26.1/73.9% mol).

A list of the reference numbers used in the figures is given hereinbelow:
1. Hydrocarbon gas inlet
2. Gas distributor
3. Gas injection orifices distributed at the bottom of the liquid metal reactor
4. Thermal heaters
5. Liquid metal media
6. Hydrocarbon gas/hydrogen gas phase after injection
7. Pre-heating conduit
8. Carbon accumulation layer
9. Porous rigid section
10. Recipient suitable for collecting carbon particles
11. Carbon extraction outlet
12. Means for moving the porous rigid section (preferably a shaft)

13. Reactor pool
14. Energy input (14) for the thermal heaters (4)
15. Carbon barrier
16. Gas outlet collector
17. Gas mixture ($H_2$+hydrocarbons) outlet
18. Thermal insulation means
19. Carbon particles.

The invention claimed is:

1. A process for the direct thermal decomposition of hydrocarbons into solid carbon and hydrogen comprising:
   a. preheating a hydrocarbon gas stream and conducting the hydrocarbon gas stream from at least one hydrocarbon gas stream inlet, located at a top part of a liquid metal reactor, to a bottom part of the liquid metal reactor, through a pre-heating conduit located surrounding the external perimeter of the liquid metal reactor, said pre-heating conduit being located inside a thermal insulation means, and obtaining a pre-heated hydrocarbon gas stream at a temperature between 500° C. and 700° C.;
   b. injecting the pre-heated hydrocarbon gas stream obtained in step (a) into a reactor pool, containing a liquid metal media, of the liquid metal reactor, wherein said injection takes place at the bottom part of the liquid metal reactor through a porous section or a set of gas injection orifices;
   c. the hydrocarbon gas injected into the liquid metal reactor in step (b) moves upwards by buoyancy forming a multi-phase flow including a hydrocarbon gas comprising hydrogen and solid carbon, at the same time that the liquid metal media inside the reactor pool is maintained at a temperature comprised between 900° C. and 1200° C.;
   d. the solid carbon obtained in step (c) is accumulated at a top part of the reactor pool, on a free surface of the liquid metal media located inside the liquid metal reactor, forming a carbon layer made up of solid carbon particles;
   e. once the carbon layer reaches a determined thickness, the carbon particles constituting the carbon layer are displaced into at least one carbon extraction system consisting of a porous rigid section located at the top of the liquid metal reactor, above the free surface of the liquid metal media, from which the carbon particles are conducted into at least one recipient for collecting the carbon particles; and
   f. at the same time, the gas comprising hydrogen obtained in step (c) leaves the reactor pool through the porous rigid section, being collected at a gas outlet collector from where the gas comprising hydrogen finally leaves the liquid metal reactor.

2. A process according to claim 1, wherein the temperature inside the reactor pool is reached by means of at least one thermal heater located inside the reactor pool.

3. A process according to claim 1, wherein the thickness of the carbon layer reached in step (c) is between 1 cm and 15 cm.

4. A process according to claim 1, wherein the conduction of the carbon particles towards the recipient for collecting said carbon particles is facilitated by a vibrational movement generated by a mechanical shaft.

5. A device for the direct thermal decomposition of hydrocarbons into solid carbon and hydrogen, comprising:
   a. a pre-heating conduit comprising at least one hydrocarbon gas inlet located at a top part of a liquid metal reactor and at least one hydrocarbon gas outlet located at a bottom part of the liquid metal reactor corresponding to the hydrocarbon gas inlet into the liquid metal reactor, and a reactor pool designed for containing a liquid metal media, wherein said pre-heating conduit is located inside a thermal insulation means;
   b. the liquid metal reactor further comprises at least one thermal heater located inside the reactor pool for inducing a homogeneous temperature inside the liquid metal reactor;
   c. at the top of the liquid metal reactor, at least one carbon extraction system consisting of a porous rigid section is located, said porous rigid section being connected to at least one recipient suitable for collecting carbon particles; and
   d. the porous rigid section incorporates, at the top of it, a carbon barrier designed for the carbon particle retention, wherein said carbon barrier separates the porous rigid section from a gas outlet collector.

6. The device, according to claim 5, wherein the connection between the porous rigid section and the recipient suitable for collecting carbon particles further incorporates mechanical means for facilitating the movement of the solid carbon particles.

* * * * *